(12) United States Patent
Panger et al.

(10) Patent No.: US 11,546,832 B2
(45) Date of Patent: Jan. 3, 2023

(54) METHODS AND APPARATUS TO REDIRECT INTERNET CLIENTS FOR MEDIA MONITORING

(71) Applicant: The Nielsen Company (US), LLC, New York, NY (US)

(72) Inventors: Marko Panger, Skofije (SI); Andrej Barbis, Ilirska Bistrica (SI); Marko Usaj, Izola (SI); Joseph Kerkes, Lutz, FL (US); Mohd Afwaan Ahmed Quadri, Toronto (CA)

(73) Assignee: THE NIELSEN COMPANY (US), LLC, New York, NY (US)

( * ) Notice: Subject to any disclaimer, the term of this patent is extended or adjusted under 35 U.S.C. 154(b) by 44 days.

(21) Appl. No.: 17/325,143

(22) Filed: May 19, 2021

(65) Prior Publication Data

US 2022/0377646 A1    Nov. 24, 2022

(51) Int. Cl.
*H04W 40/34* (2009.01)
*H04W 76/15* (2018.01)
*H04L 67/50* (2022.01)

(52) U.S. Cl.
CPC .......... *H04W 40/34* (2013.01); *H04L 67/535* (2022.05); *H04W 76/15* (2018.02)

(58) Field of Classification Search
CPC combination set(s) only.
See application file for complete search history.

(56) References Cited

U.S. PATENT DOCUMENTS

| | | |
|---|---|---|
| 9,141,947 B1 | 9/2015 | Furr et al. |
| 2013/0121253 A1 | 5/2013 | Wood et al. |
| 2020/0296608 A1 | 9/2020 | Usaj et al. |

FOREIGN PATENT DOCUMENTS

WO    2016144414 A1    9/2016

OTHER PUBLICATIONS

International Bureau, "International Search Report," issued in connection with PCT patent application No. PCT/US2022/028922, dated Aug. 23, 2022, 3 pages.
International Bureau, "Written Opinion," issued in connection with PCT patent application No. PCT/US2022/028922, dated Aug. 23, 2022, 4 pages.
Ofcom, Wi-Fi performance testing of home broadband routers, Technical Report [online], May 13, 2020 [retrieved on Aug. 2, 2022]. retrieved from <URL : https://www.ofcom.org.uk/research-anddata/telecoms-research/broadband-research/broadband-speeds/wi-fi-performance-testing> pp. 1-31; table 5; and figure 5.

*Primary Examiner* — James P Duffy
(74) *Attorney, Agent, or Firm* — Hanley, Flight & Zimmerman, LLC

(57) ABSTRACT

Methods, apparatus, systems and articles of manufacture are disclosed to redirect internet clients for media monitoring. An example apparatus disclosed herein includes a wireless communication controller to establish a plurality of connections to a WI-FI router, the plurality of connections corresponding to simulated WI-FI clients, and a client interface to identify a connection of a WI-FI client to the apparatus and route network traffic of the WI-FI client to the WI-FI router via the plurality of connections.

20 Claims, 6 Drawing Sheets

METHODS AND APPARATUS TO REDIRECT INTERNET CLIENTS FOR MEDIA MONITORING

FIELD OF THE DISCLOSURE

This disclosure relates generally to media monitoring, and, more particularly, to methods and apparatus to redirect internet clients for media monitoring.

BACKGROUND

Media providers and/or other entities such as advertising companies, broadcast networks, etc. are often interested in the viewing, listening, and/or media behavior of audience members and/or public in general. The media usage and/or exposure habits of monitored audience members, as well as demographic data about the audience members, are collected and used to statistically determine the size and demographics of an audience of interest. In recent years, media devices have been provided with Internet connectivity and the ability to retrieve media from the Internet. As such, media exposure has shifted away from conventional methods of presentation such as broadcast television, towards presentation via consumer devices accessing media via the Internet

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
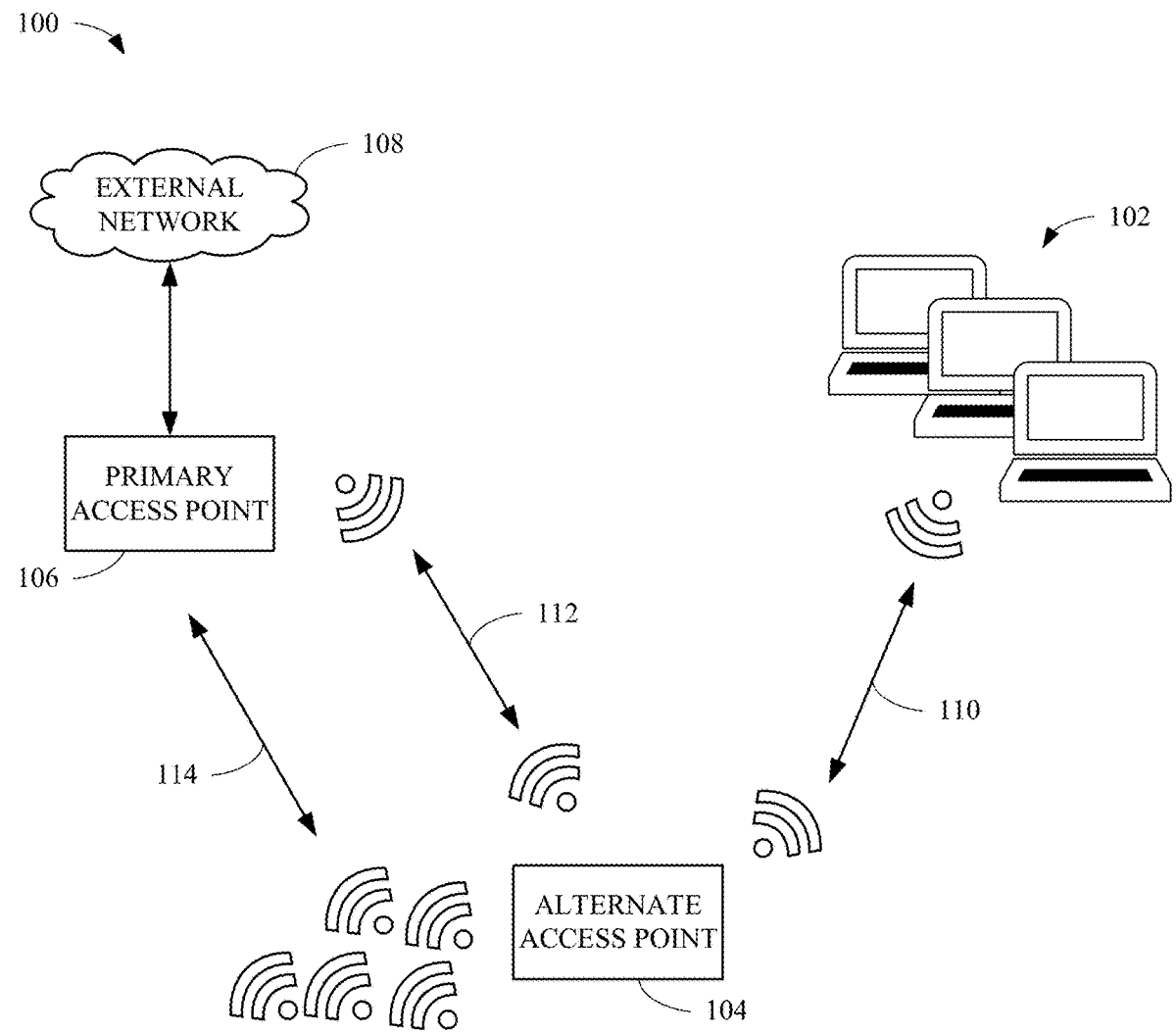
FIG. 1 is a block diagram of an example environment in which the teachings of this disclosure may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Media monitors can be installed into consenting households to monitor media consumed in that household. With recent advances in Internet technology, streaming media has become a major source of media for consumers. Certain types of media monitors, called streaming meters, allow media streamed over a network (e.g., the Internet, etc.) to be monitored. In some examples, streaming meters monitor home wireless networks (e.g., WI-FI networks, etc.) to collect records of media streamed to media devices in the home. In some examples, streaming meters use packet injection and false disassociation/deauthentication to passively monitor WI-FI traffic (e.g., by obtaining a Wi-Fi Protected Access 2 (WPA2) session key, etc.).

As used herein, streaming refers to a transmission of an object in which the object is used by the destination before the entirety of the object is received by the destination. For example, streaming media refers to the transmission of a media object (e.g., a video file, an audio file, etc.), wherein presentation of the media object at a destination may begin before the entirety of the media object is received by the destination. While examples described herein refer to monitoring streaming media, any type of media that travels via a wireless network such as a WI-FI network may be monitored in accordance with this disclosure.

Current streaming meter methods suffer from several problems that make monitoring WI-FI traffic difficult. Firstly, WI-FI Access Points protected management frames (e.g., as described in Institute of Electrical and Electronics Engineers (IEEE) 802.11w) prevent the streaming meter from forcibly disconnecting a WI-FI client using packet injection, which further prevents the streaming meter from decoding the associated WI-FI traffic. Secondly, future WI-FI security protocols (e.g., WPA3, etc.) may utilize encryption to prevent a third party device from obtaining session keys from traffic monitoring. In such examples, future WI-FI security protocols may only allow bandwidth usage to be determined by a snooping device and not allow for the collection of details of wireless transactions. Thirdly, multiple input/multiple output (MIMO) configurations and multi-user multiple input/multiple output (MU-MIMO) configurations make determining the location of the streaming meter more important in decoding the traffic. In some examples, such configurations make reconstructing multiple signals into useful data difficult.

Methods, apparatus and systems disclosed herein enable the monitoring of WI-FI traffic using an alternate access point installed into a home with the same network credentials (e.g., Service Set Identifier (SSID), password, etc.) as the home's primary access point. In some examples disclosed herein, the alternate access point is a streaming meter. Example techniques disclosed herein include generating substitute connections to the home's primary access point such that the WI-FI connections of the home's primary access point are exhausted. Disclosed example techniques also include establishing a connection with client devices to provide the client devices with the WI-FI network of the alternate access point. Disclosed example techniques further include monitoring traffic of the client devices for media monitoring.

FIG. 1 is a block diagram of an example environment 100 in which the teachings of this disclosure may be implemented. In the illustrated example, the environment 100 is a home of a consumer. In other examples, the environment 100 can be any area in which streaming media is viewed (e.g., public transit, a business, etc.). The example environment 100 includes example client device(s) 102, an example alternate access point 104, an example primary access point 106, and an example external network 108. In the illustrated example, the client device(s) 102 and the alternate access point 104 establish an example first connection 110. In some examples, the first connection 110 is a plurality of connections corresponding to the number of client device(s) 102. For example, the alternate access point 104 receives media requests transmitted by the client device(s) 102 via the first connection 110. In the illustrated example of FIG. 1, the alternate access point 104 and the primary access point 106 establish an example permanent connection 112. The example alternate access point 104 and the example primary access point 106 establish example substitute connections 114. For example, the alternate access point 104 routes connections of the client device(s) 102 to the primary access point 106 via the permanent connection 112.

In some examples, the client device(s) 102 are media streaming devices. For example, the client device(s) 102 are devices that retrieve media from the external network 108 for presentation. In some examples, the client device(s) 102 are capable of directly presenting media (e.g., via a display). In other examples, the client device(s) 102 can present the media on separate media presentation equipment (e.g., speakers, a display, etc.). Thus, the client device(s) 102 may or may not be able to present media without assistance from a second device. In examples disclosed herein, the environment 100 can include any number of client device(s) 102 (e.g., one client device, two client devices, etc.). The example client device(s) 102 are typically consumer electronics. For example, the client device(s) 102 can be Internet-enabled mobile devices (e.g., a smartphone, a portable music player, a portable video player, etc.), video game consoles, tablet computers, digital media players (e.g., digital video recorder, over-the-top devices, etc.), smart televisions, desktop computers, laptop computers, servers, etc.

The example alternate access point 104 is a networking device that facilitates a connection between the client device(s) 102 and the primary access point 106. In the illustrated example of FIG. 1, the alternate access point 104 has the same network credentials (e.g., the same SSID and password, etc.) as the primary access point 106. In the illustrated example of FIG. 1, the alternate access point 104 establishes the permanent connection 112 to the primary access point 106. In the illustrated example, the alternate access point 104 determines the total number of possible connections, N, of the primary access point 106. For example, the alternate access point 104 determines the primary access point 106 can connect to six devices (e.g., N=6).

The example alternate access point 104 generates and establishes the substitute connections 114. For example, the alternate access point 104 establishes N−1 substitute connections to the primary access point 106. That is, the alternate access point 104 exhausts the connections of the primary access point 106. Thus, in some examples, the client device(s) 102 do not connect to the primary access point 106 directly. In such examples, the alternate access point 104 routes network traffic of the client device(s) 102 to the primary access point 106 via the permanent connection 112. In some examples, if the alternate access point 104 fails (e.g., a power failure, malfunctions etc.), the client device(s) 102 automatically connect to the primary access point 106.

In some examples, the alternate access point 104 is a hardware device provided by a monitoring agency (e.g., a monitoring element of a media provider, an independent monitoring entity, etc.). That is, in some examples, the alternate access point 104 is a streaming meter. In some examples, the alternate access point 104 monitors the traffic of the client device(s) 102. In such examples, the example first connection 110 can include the media requests. In some examples, the alternate access point 104 creates records of media transmitted to the client device(s) 102 via the alternate access point 104. In some examples, the example alternate access point 104 can also be physically connected to one or more media devices (e.g., via an ethernet connection, etc.). In such examples, the alternate access point 104 can also monitor traffic transmitted via the physical connection.

The example primary access point 106 is a networking device that facilitates connection between the alternate access point 104 and the external network 108. In some examples, the primary access point 106 is a hardware device provided by an internet provider of the environment 100. In some examples, the primary access point 106 can be connected to a router (e.g., a WI-FI router). In other examples, the primary access point 106 can be integrated into a router. In the illustrated example of FIG. 1, the primary access point 106 communicates with the client device(s) 102 via the alternate access point 104.

The example external network 108 is an example network that extends over an area larger than the environment 100. For example, the external network 108 can include the Internet, a wide-area network (WAN), etc. The example external network 108 allows the client device(s) 102 to connect to a web-location that contains media (e.g., a server associated with a streaming service, etc.). In such examples, the external network 108 can facilitate the transmission of the media to the client device(s) 102 via the alternate access point 104 and/or the primary access point 106.

Figure 2:
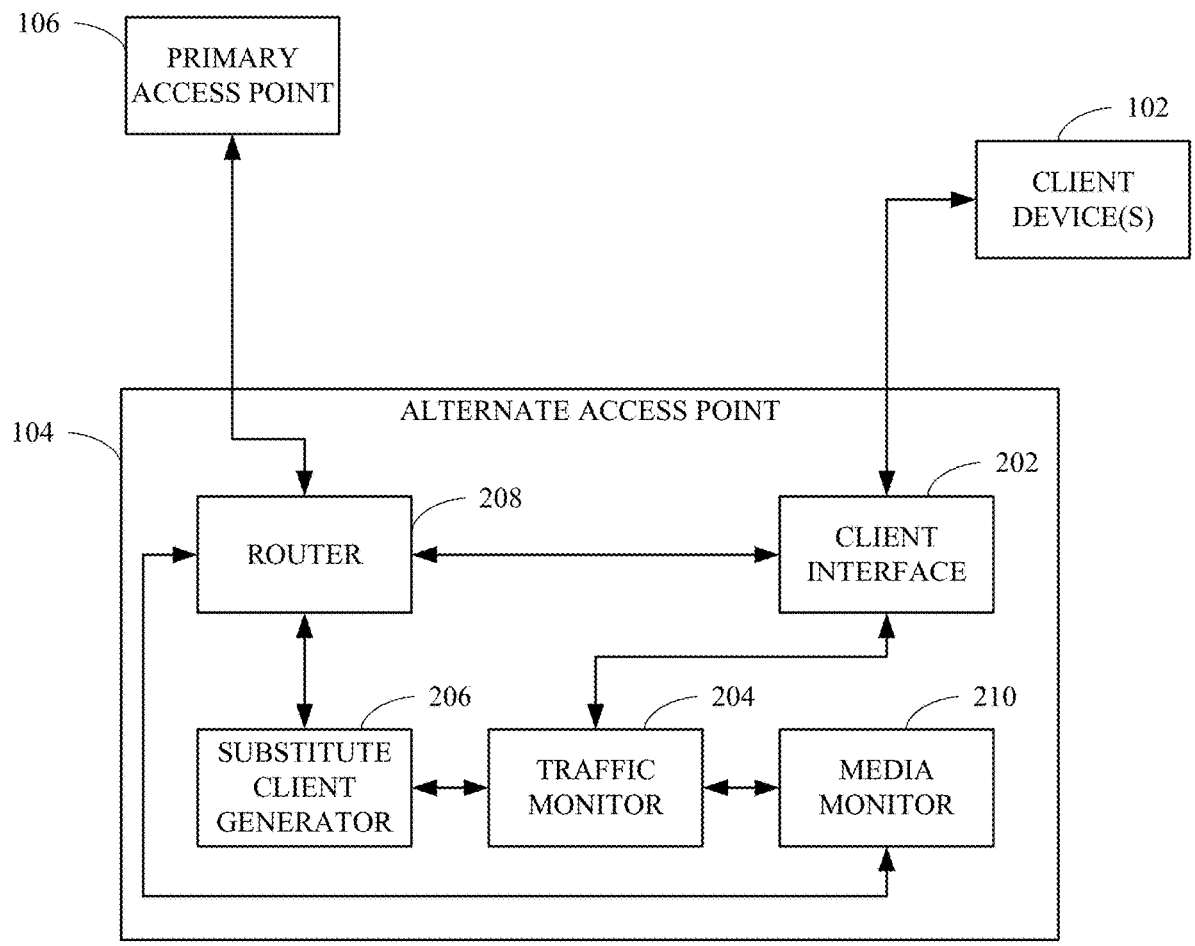
FIG. 2 is a block diagram of an example implementation of the streaming meter of FIG. 1

FIG. 2 is a block diagram of an example implementation of the alternate access point 104 of FIG. 1. The example alternate access point 104 includes an example client interface 202, an example traffic monitor 204, an example substitute client generator 206, an example router 208, and an example media monitor 210.

The example client interface 202 receives wireless transmissions transmitted within its detection range and transmits wireless signals from the alternate access point 104 to the client device(s) 102 (FIG. 1). For example, the client interface 202 receives transmissions from the client device(s) 102. That is, the client interface 202 facilitates standard communication with the client device(s) 102. In some examples, the client interface 202 configures the network credentials (e.g., the SSID, the password, etc.) of the alternate access point 104. For example, the client interface 202 receives instructions to change the SSID and password of the alternate access point 104 to that of the primary access point 106. In other examples, the client interface 202 configures any other suitable characteristics of the alternate access point 104.

The example traffic monitor 204 monitors the traffic of the primary access point 106 (FIG. 1). In some examples, the traffic monitor 204 queries the router 208 to determine the network addresses of packets transmitted and/or intercepted via the alternate access point 104. For example, the traffic monitor 204 determines identifiers (e.g., a MAC address, an SSID, etc.) in the connections between the client device(s) 102 and the alternate access point 104 (e.g., the first connection 110) that indicate the identity of the client device(s) 102. Additionally or alternatively, the traffic monitor 204 determines identifiers in the connections between the primary access point 106 and the alternate access point 104 (e.g., the permanent connection 112 of FIG. 1, the substitute connections 114 of FIG. 1, etc.) that indicate the identity of the primary access point 106. In some examples, the traffic monitor 204 analyzes traffic transmitted via the alternate access point 104. In such examples, the traffic monitor 204 identifies traffic related to media requests from streaming services. In some examples, the traffic monitor 204 can also monitor traffic transmitted over one or more physical connections.

The example substitute client generator 206 generates substitute clients to be transmitted by the router 208 to the primary access point 106. For example, the substitute client generator 206 generates simulated WI-FI clients to connect to the primary access point 106. For example, the substitute client generator 206 generates a first packet to establish the permanent connection 112 between the alternate access point 104 and the primary access point 106. In examples disclosed herein, the substitute client generator 206 determines the number of possible connections, N, the primary access point 106 can make based on the permanent connection 112. For example, the substitute client generator 206 queries the primary access point 106 via the permanent connection 112. The substitute client generator 206 determines a number of substitute clients to generate based on the number of possible connections. For example, the substitute client generator 206 determines to generate N-1 substitute clients to establish the substitute connections 114. In such examples, the substitute client generator 206 generates N-1 packets to establish N-1 substitute connections (e.g., the substitute connections 114) between the alternate access point 104 and the primary access point 106.

The example router 208 is used for communications with WI-FI clients (e.g., the client device(s) 102) and to enable the alternate access point 104 with conventional access point functionalities. For example, the router 208 can direct data packets received via the client interface 202 and/or external network 108 to their intended destinations. In such examples, the router 208 can detect a network address embedded in the packet to determine the destination of the packet. In some examples, the traffic monitor 204 and/or the media monitor 210 can interface with the router 208 to receive the network address. In some examples, the router 208 includes any number of individual routers configured to specific WI-FI transmission bands (e.g., 2.4 GHz, 5 GHz, etc.).

The example media monitor 210 analyzes media requests transmitted via the alternate access point 104. For example, the media monitor 210 extracts information from a media request (e.g., a request to stream media from a streaming service, etc.) that includes media identifying information. In some examples, the media monitor 210 extracts a watermark and/or generates a fingerprint based on the transmitted media request. In some examples, the media monitor 210 correlates the destination of the media request (e.g., a particular streaming service, etc.) and the media request to identify the media associated with the media request (e.g., via a look-up table, etc.). In some examples, the media identifying information includes user identifying information. In some examples, the media monitor 210 transmits the extracted media identifying information to a central facility of an audience measurement entity. In such examples, the media monitor 210 can transmit the media identifying information periodically or continuously. In some examples, the media monitor 210 stores the media identifying information on a memory associated with the alternate access point 104. In such examples, the media identifying information can manually be retrieved by a technician associated with the audience measurement entity.

While an example manner of implementing the alternate access point 104 of FIG. 1 is illustrated in FIG. 2, one or more of the elements, processes and/or devices illustrated in FIG. 2 may be combined, divided, re-arranged, omitted, eliminated and/or implemented in any other way. Further, the example client interface 202, the example traffic monitor 204, the example substitute client generator 206, the example router 208, the example media monitor 210 and/or, more generally, the example alternate access point 104 of FIG. 2 may be implemented by hardware, software, firmware and/or any combination of hardware, software and/or firmware. Thus, for example, any of the example client interface 202, the example traffic monitor 204, the example substitute client generator 206, the example router 208, the example media monitor 210 and/or, more generally, the example alternate access point 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example client interface 202, the example traffic monitor 204, the example substitute client generator 206, the example router 208, the example media monitor 210, and/or the example alternate access point 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example alternate access point 104 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
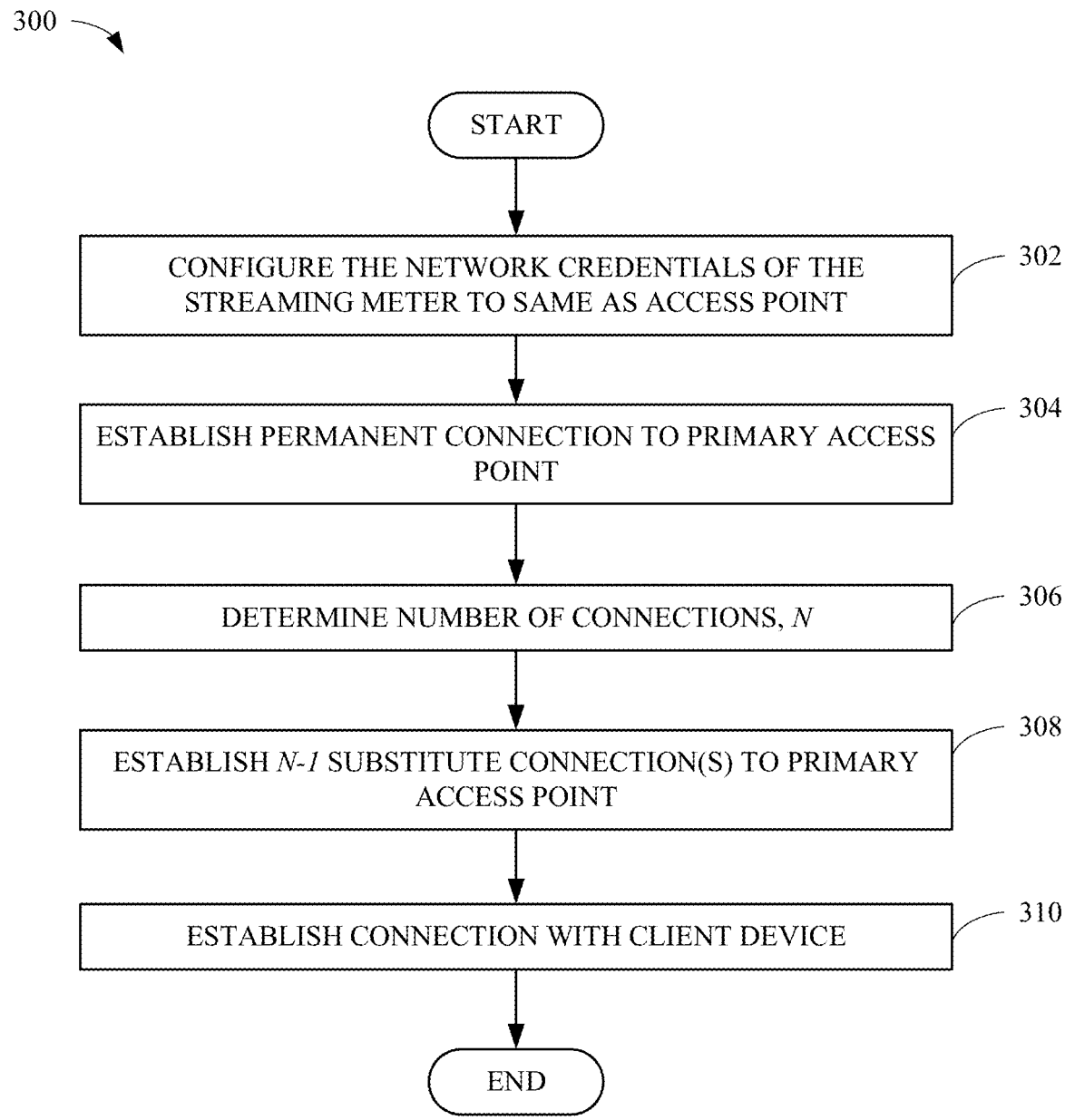
FIGS. 3-4 are flowcharts representative of machine readable instructions which may be executed to implement the example streaming meter of FIGS. 1 and/or 2.
Figure 4:
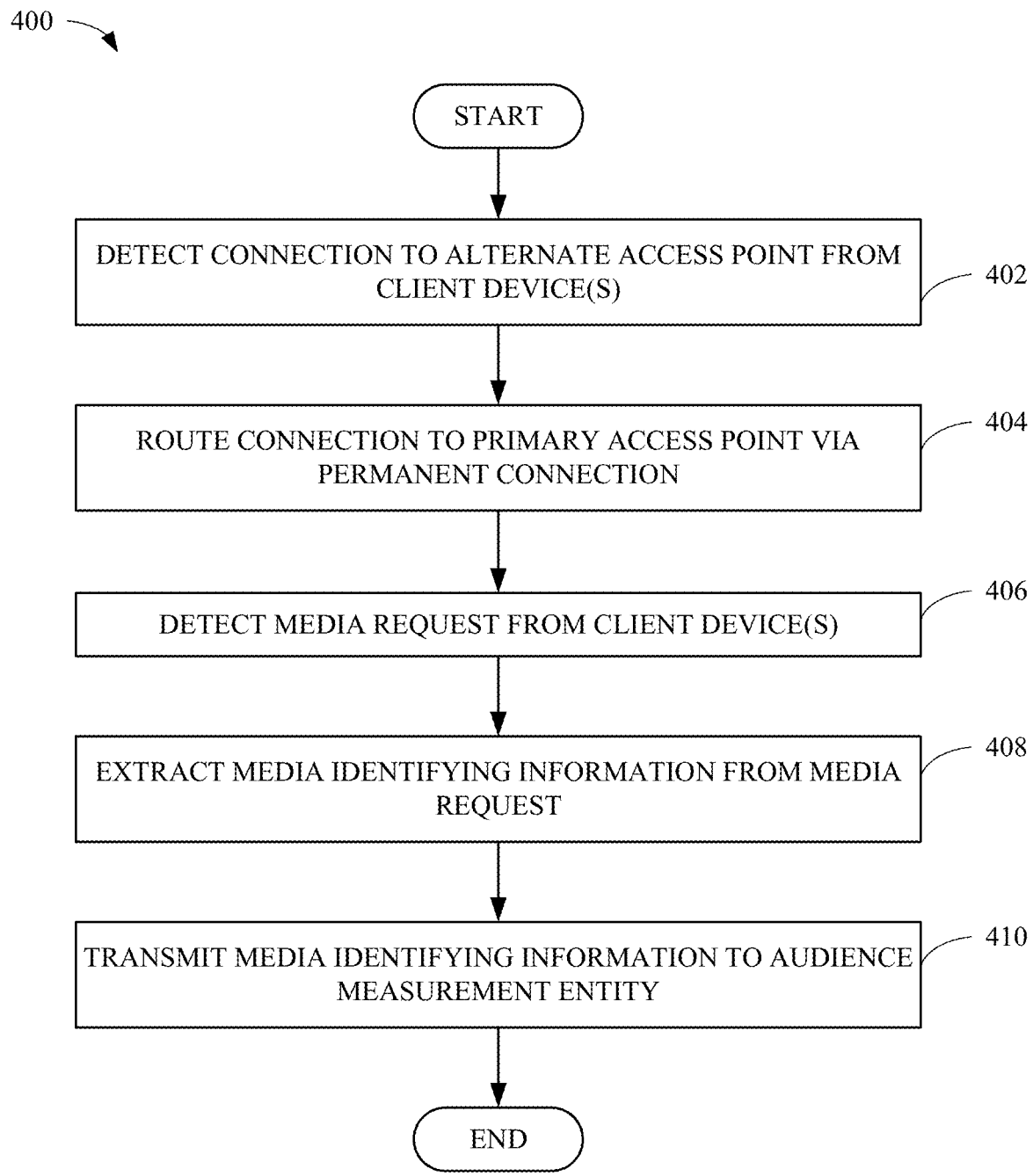

Flowcharts representative of example hardware logic, machine readable instructions, hardware implemented state machines, and/or any combination thereof for implementing the alternate access point 104 of FIGS. 1 and/or 2 are shown in FIGS. 3-4. The machine readable instructions may be one or more executable programs or portion(s) of an executable program for execution by a computer processor and/or processor circuitry, such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example alternate access point 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine-readable instructions which may be executed to implement the example alternate access point 104 of FIGS. 1 and/or 2. The example process 300 of the illustrated example of FIG. 3 begins at block 302, at which the example client interface 202 (FIG. 2) configures the network credentials of the alternate access point 104 to be the same as the primary access point 106 (FIG. 1). For example, the client interface 202 can receive the SSID and password from the household associated with the primary access point 106. In some examples, a technician installing the alternate access point 104 can ask a member of the household for the password. In such examples, the technician can provide the network credentials to the alternate access point 104 via the client interface 202. In other examples, the client interface 202 can configure any other suitable credentials of the alternate access point 104. In other examples, the client interface 202 can receive network credentials (e.g., the SSID and/or password) by any other suitable means.

The example router 208 (FIG. 2) establishes a connection to the primary access point 106 (FIG. 1) (block 304). For example, the router 208 establishes the example permanent connection 112 (FIG. 1) between the alternate access point 104 and the primary access point 106. The example substitute client generator 206 (FIG. 2) determines a number of connections, N (block 306). For example, the substitute client generator 306 queries the primary access point 106 to determine the number of possible connections the primary access point 106 can make.

The example substitute client generator 206 establishes substitute connections to the primary access point 106 (block 308). For example, the substitute client generator 206 establishes N−1 substitute connections between the alternate access point 104 and the primary access point 106. That is, the substitute client generator 206 establishes the substitute connections 114 (FIG. 1). The example client interface 202 establishes a connection with client device(s) 102 (block 310). For example, the client interface 202 establishes the first connection 110 (FIG. 1) between the client device(s) 102 and the alternate access point 104.

FIG. 4 is a flowchart representative of machine-readable instructions which may be executed to implement the example alternate access point 104 of FIGS. 1 and/or 2. The example process 400 of the illustrated example of FIG. 4 begins at block 402, at which the traffic monitor 204 (FIG. 2) detects a connection from the client device(s) 102 (FIG. 1). For example, the traffic monitor 204 detects the first connection 110 (FIG. 1). The example router 208 routes the connection to the primary access point 106 (FIG. 1) via the permanent connection 112 (FIG. 1) (block 404). For example, the router 208 directs data packets from the client device(s) 102 to the primary access point 106 via the permanent connection 112.

The example traffic monitor 204 detects a media request from the client device(s) 102 (block 406). For example, the traffic monitor 204 detects a request transmitted to a streaming service via the alternate access point 104. In other examples, the traffic monitor 204 can detect a media request by any other suitable method.

The example media monitor 210 (FIG. 2) extracts media identifying information from media request (block 408). For example, the media monitor 210 can extract a media identifier from the media request. In some examples, the media monitor 210 can extract other information from the media request (e.g., demographic information associated with a user of the client device(s) 102, a timestamp related to the media request, etc.).

The example router 208 (FIG. 2) transmits media identifying information to the audience measurement entity (block 410). For example, the router 208 can cause the media identifying information to be transmitted via any suitable means (e.g., wireless, cellular, etc.). Additionally or alternatively, the media identifying information can be stored on a memory associated with the alternate access point 104. In such examples, the media identifying information can be retrieved from the alternate access point 104 by a technician associated with the audience measurement entity.

Figure 5:
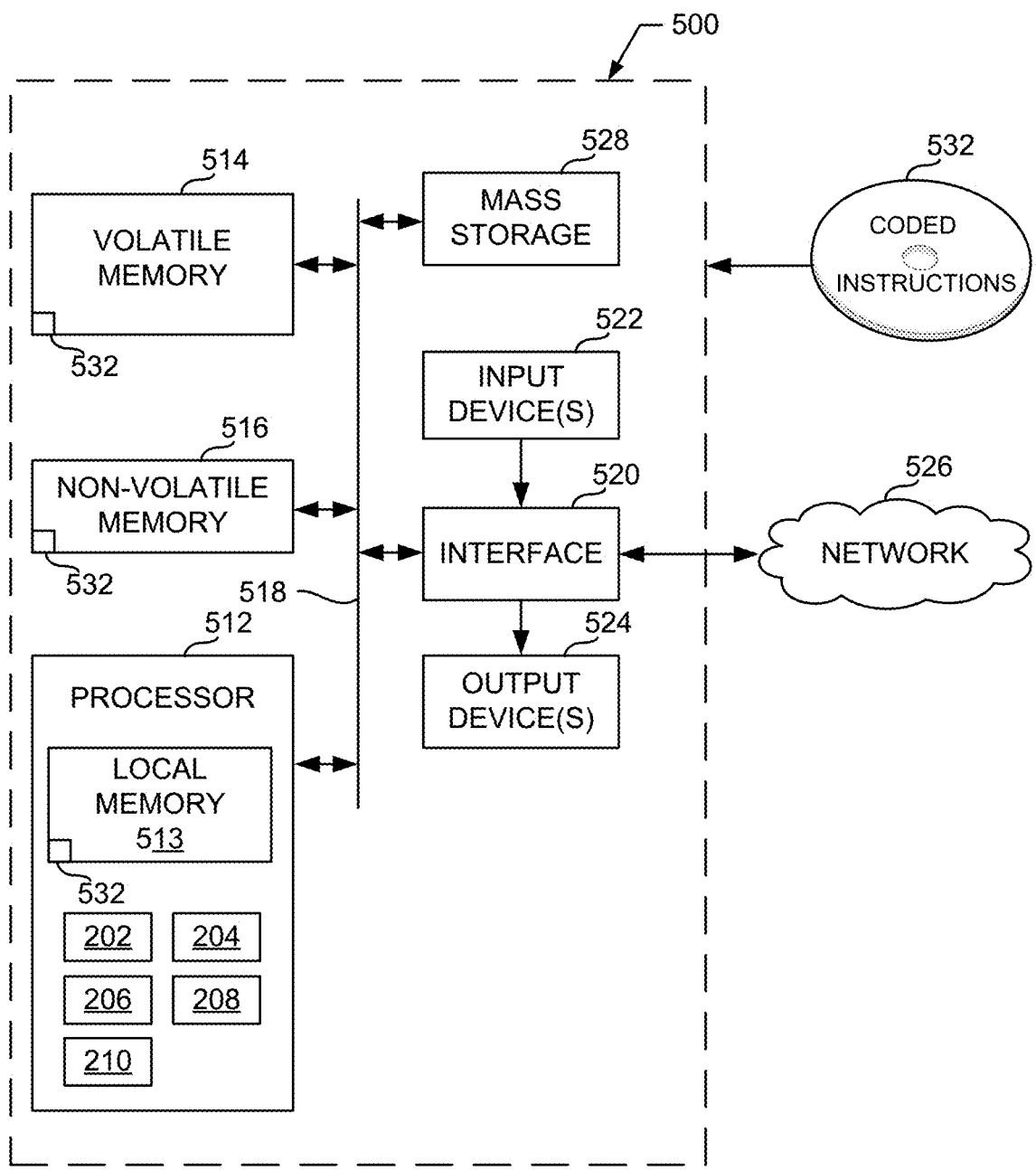
FIG. 5 is a block diagram of an example processing platform structured to execute the instructions of FIGS. 3-4 to implement the example streaming meter of FIGS. 1 and/or 2.

FIG. 5 is a block diagram of an example processor platform 500 structured to execute the instructions of FIGS. 3-4 to implement the alternate access point 104 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example client interface 202, the example traffic monitor 204, the example substitute client generator 206, the example router 208, and the example media monitor 210.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

Figure 6:
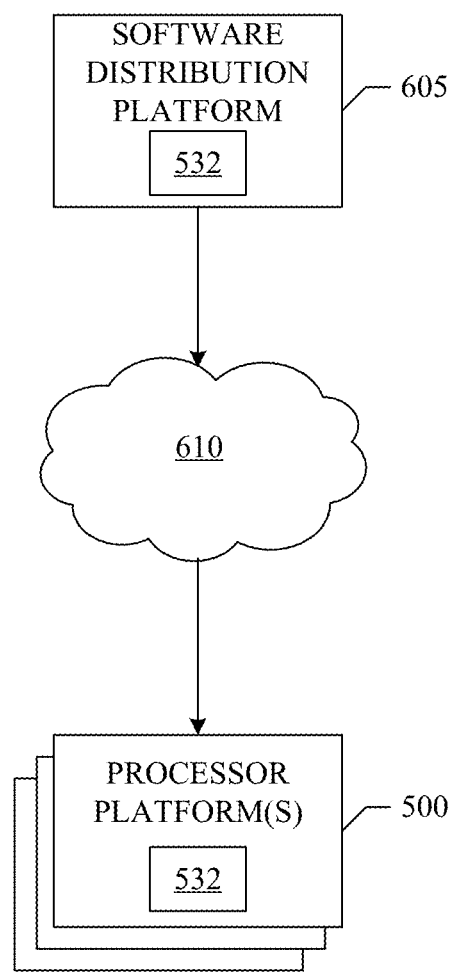
FIG. 6 is a block diagram of an example software distribution platform to distribute software (e.g., software corresponding to the example computer readable instructions of FIGS. 3-4) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 605 to distribute software such as the example computer readable instructions 532 of FIG. 5 to third parties is illustrated in FIG. 6. The example software distribution platform 605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 532 of FIG. 5. The third parties may be consumers, users, retailers, OEMs, etc., who purchase and/or license the software for use and/or re-sale and/or sub-licensing. In the illustrated example, the software distribution platform 605 includes one or more servers and one or more storage devices. The storage devices store the computer readable instructions 532, which may correspond to the example computer readable instructions of FIGS. 3-4, as described above. The one or more servers of the example software distribution platform 605 are in communication with a network 610, which may correspond to any one or more of the Internet and/or any of the example networks 108, 526 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 532 from the software distribution platform 605. For example, the software, which may correspond to the example computer readable instructions of FIGS. 3-4, may be downloaded to the example processor platform 500, which is to execute the computer readable instructions 532 to implement the alternate access point 104. In some example, one or more servers of the software distribution platform 605 periodically offer, transmit, and/or force updates to the software (e.g., the example computer readable instructions 532 of FIG. 5) to ensure improvements, patches, updates, etc. are distributed and applied to the software at the end user devices.

From the foregoing, it will be appreciated that example methods, apparatus and articles of manufacture have been disclosed that allow monitoring of Wi-Fi traffic using an alternate access point. The example methods, apparatus and articles of manufacture capture all Wi-Fi traffic that would be routed through the primary access point without needing to decode the traffic. Additionally, because the alternate access point uses the same network credentials as the primary access point, it is transparent to users when they are moved to another access point. Additionally, if the alternate access point malfunctions, the client device will automatically connect to the primary access point.

Example methods, apparatus, systems, and articles of manufacture to redirect internet clients for media monitoring are disclosed herein. Further examples and combinations thereof include the following:

Example 1 includes an apparatus comprising a wireless communication controller to establish a plurality of connections to a WI-FI router, the plurality of connections corresponding to simulated WI-FI clients, and a client interface to identify a connection of a WI-FI client to the apparatus, and route network traffic of the WI-FI client to the WI-FI router via the plurality of connections.

Example 2 includes the apparatus of example 1, wherein the plurality of connections includes a first connection, and further including a substitute client generator to query the WI-FI router via the first connection.

Example 3 includes the apparatus of example 2, wherein the substitute client generator is to determine the plurality of connections is one less than a total number of possible connections of the WI-FI router based on the query.

Example 4 includes the apparatus of example 1, wherein the WI-FI client is not able to connect to the WI-FI router.

Example 5 includes the apparatus of example 1, wherein the client interface is to configure the apparatus to have the same network credentials as the WI-FI router.

Example 6 includes the apparatus of example 5, wherein the network credentials include a service set identifier (SSID) and a password.

Example 7 includes the apparatus of example 1, further including a traffic monitor to identify a media request transmitted from the WI-FI client.

Example 8 includes the apparatus of example 7, further including a media monitor to extract media identifying information from the media request, and transmit the media identifying information to an audience measurement entity.

Example 9 includes at least one non-transitory computer readable medium comprising instructions that, when executed, cause at least one processor to at least establish a plurality of connections to a WI-FI router, the plurality of connections corresponding to simulated WI-FI clients, identify a connection of a WI-FI client to an apparatus, and route network traffic of the WI-FI client to the WI-FI router via the plurality of connections.

Example 10 includes the at least one non-transitory computer readable medium of example 9, wherein the plurality of connections includes a first connection, and the instructions, when executed, cause the at least one processor to query the WI-FI router via the first connection.

Example 11 includes the at least one non-transitory computer readable medium of example 10, wherein the instructions, when executed, cause the at least one processor to determine the plurality of connections is one less than a total number of possible connections of the WI-FI router based on the query.

Example 12 includes the at least one non-transitory computer readable medium of example 9, wherein the WI-FI client is not able to connect to the WI-FI router.

Example 13 includes the at least one non-transitory computer readable medium of example 9, wherein the instructions, when executed, cause the at least one processor to configure the apparatus to have the same network credentials as the WI-FI router.

Example 14 includes the at least one non-transitory computer readable medium of example 13, wherein the network credentials include a service set identifier (SSID) and a password.

Example 15 includes the at least one non-transitory computer readable medium of example 9, wherein the instructions, when executed, cause the at least one processor to identify a media request transmitted from the WI-FI client.

Example 16 includes the at least one non-transitory computer readable medium of example 15, wherein the instructions, when executed, cause the at least one processor to extract media identifying information from the media request, and transmit the media identifying information to an audience measurement entity.

Example 17 includes an apparatus comprising at least one storage device, and processor circuitry to establish a plurality of connections to a WI-FI router, the plurality of connections corresponding to simulated WI-FI clients, identify a connection of a WI-FI client to the apparatus, and route network traffic of the WI-FI client to the WI-FI router via the plurality of connections.

Example 18 includes the apparatus of example 17, wherein the plurality of connections includes a first connection, and the processor circuitry is to query the WI-FI router via the first connection.

Example 19 includes the apparatus of example 18, wherein the processor circuitry is to determine the plurality of connections is one less than a total number of possible connections of the WI-FI router based on the query.

Example 20 includes the apparatus of example 17, wherein the WI-FI client is not able to connect to the WI-FI router.

Example 21 includes the apparatus of example 17, wherein the processor circuitry is to configure the apparatus to have the same network credentials as the WI-FI router.

Example 22 includes the apparatus of example 21, wherein the network credentials include a service set identifier (SSID) and a password.

Example 23 includes the apparatus of example 17, wherein the processor circuitry is to identify a media request transmitted from the WI-FI client.

Example 24 includes the apparatus of example 23, wherein the processor circuitry is to extract media identifying information from the media request, and transmit the media identifying information to an audience measurement entity.

Example 25 includes a method comprising establishing a plurality of connections to a WI-FI router, the plurality of connections corresponding to simulated WI-FI clients, identifying a connection of a WI-FI client to an apparatus, and routing network traffic of the WI-FI client to the WI-FI router via the plurality of connections.

Example 26 includes the method of example 25, wherein the plurality of connections includes a first connection, and further including querying the WI-FI router via the first connection.

Example 27 includes the method of example 26, further including determining the plurality of connections is one less than a total number of possible connections of the WI-FI router based on the query.

Example 28 includes the method of example 25, wherein the WI-FI client is not able to connect to the WI-FI router.

Example 29 includes the method of example 25, further including configuring the apparatus to have the same network credentials as the WI-FI router.

Example 30 includes the method of example 29, wherein the network credentials include a service set identifier (SSID) and a password.

Example 31 includes the method of example 25, further including identifying a media request transmitted from the WI-FI client.

Example 32 includes the method of example 31, further including extracting media identifying information from the media request, and transmitting the media identifying information to an audience measurement entity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a wireless communication controller to establish a plurality of connections to a WI-FI router, the plurality of connections corresponding to simulated WI-FI clients; and
   a client interface to:
      identify a connection of a WI-FI client to the apparatus; and
      route network traffic of the WI-FI client to the WI-FI router via the plurality of connections.

2. The apparatus of claim 1, wherein the plurality of connections includes a first connection, and further including a substitute client generator to query the WI-FI router via the first connection.

3. The apparatus of claim 2, wherein the substitute client generator is to determine the plurality of connections is one less than a total number of possible connections of the WI-FI router based on the query.

4. The apparatus of claim 1, wherein the WI-FI client is not able to connect to the WI-FI router.

5. The apparatus of claim 1, wherein the client interface is to configure the apparatus to have the same network credentials as the WI-FI router.

6. The apparatus of claim 1, further including a traffic monitor to identify a media request transmitted from the WI-FI client.

7. The apparatus of claim 6, further including a media monitor to:
   extract media identifying information from the media request; and
   transmit the media identifying information to an audience measurement entity.

8. At least one non-transitory computer readable medium comprising instructions that, when executed, cause at least one processor to at least:
   establish a plurality of connections to a WI-FI router, the plurality of connections corresponding to simulated WI-FI clients;
   identify a connection of a WI-FI client to an apparatus; and
   route network traffic of the WI-FI client to the WI-FI router via the plurality of connections.

9. The at least one non-transitory computer readable medium of claim 8, wherein the plurality of connections includes a first connection, and the instructions, when executed, cause the at least one processor to query the WI-FI router via the first connection.

10. The at least one non-transitory computer readable medium of claim 9, wherein the instructions, when executed, cause the at least one processor to determine the plurality of connections is one less than a total number of possible connections of the WI-FI router based on the query.

11. The at least one non-transitory computer readable medium of claim 8, wherein the WI-FI client is not able to connect to the WI-FI router.

12. The at least one non-transitory computer readable medium of claim 8, wherein the instructions, when executed, cause the at least one processor to configure the apparatus to have the same network credentials as the WI-FI router.

13. The at least one non-transitory computer readable medium of claim 8, wherein the instructions, when executed, cause the at least one processor to identify a media request transmitted from the WI-FI client.

14. The at least one non-transitory computer readable medium of claim 13, wherein the instructions, when executed, cause the at least one processor to:
    extract media identifying information from the media request; and
    transmit the media identifying information to an audience measurement entity.

15. An apparatus comprising:
    at least one storage device; and
    processor circuitry to:
        establish a plurality of connections to a WI-FI router, the plurality of connections corresponding to simulated WI-FI clients;
    identify a connection of a WI-FI client to the apparatus; and
    route network traffic of the WI-FI client to the WI-FI router via the plurality of connections.

16. The apparatus of claim 15, wherein the plurality of connections includes a first connection, and the processor circuitry is to query the WI-FI router via the first connection.

17. The apparatus of claim 16, wherein the processor circuitry is to determine the plurality of connections is one less than a total number of possible connections of the WI-FI router based on the query.

18. The apparatus of claim 15, wherein the processor circuitry is to configure the apparatus to have the same network credentials as the WI-FI router.

19. The apparatus of claim 15, wherein the processor circuitry is to identify a media request transmitted from the WI-FI client.

20. The apparatus of claim 19, wherein the processor circuitry is to:
    extract media identifying information from the media request; and
    transmit the media identifying information to an audience measurement entity.

* * * * *